Patented Apr. 8, 1947

2,418,795

UNITED STATES PATENT OFFICE 2,418,795

HARDENABLE PLASTIC COMPOSITION

Max Skolnik, Chicago, Ill.

No Drawing. Application July 9, 1943,
Serial No. 494,117

3 Claims. (Cl. 106—107)

The present invention relates to a plastic composition capable of setting to a hardened material and to the hardened material produced therefrom. It particularly relates to a plastic composition comprising a magnesium oxychloride cement and a finely divided, normally hard bitumen as essential ingredients.

The normally solid, high melting point bitumens such as "core pitch," the residue derived from the distillation of coal tar and the like, may be prepared in finely divided form and may be shaped or molded by the application of heat and pressure. The molded products produced from such solid, high melting point bitumens are usually brittle when cooled and have little structural strength. They are water-resistant and flammable.

It is an object of the present invention to provide plastic compositions utilizing such normally hard bitumens which may be formed into water-resistant and fire-resistant articles having high structural strength.

It is another object of the present invention to provide a plastic composition utilizing a substantial quantity of a finely divided, relatively high melting point, normally solid bitumen, which, without the necessity of applying externally applied heat and pressure, will set to a hard, water-resistant and fire-resistant material having relatively high structural strength and relatively low density.

It is a further object of the present invention to provide a plastic composition, containing as a major filling and water-proofing ingredient a finely divided, high melting point bitumen, having the character of "core pitch," a distillation residue of coal tar.

It is a still further object of the present invention to provide a method of utilizing the distillation residues from coal tar or petroleum for the making of plastic compositions capable of setting or hardening to a water-resistant, waterproof material having relatively high structural strength without the application of heat or pressure.

Other objects will be apparent from the following detailed description of the invention.

In the preparation of formed articles from magnesium oxychloride cement, it is almost essential that a substantial amount of filling material be present in order to obtain high structural strength and desirable properties. The filling materials usually used are powders, such as finely divided silica, limestone, wood flour or the like.

In order to render such compositions more repellent to water, it has heretofore been proposed to incorporate relatively small amounts of waxes and normally liquid bitumen, such as asphalt, vegetable tars or pitches in the composition. If strength was not to be too greatly deteriorated, the amounts of such waterproofing materials present in the composition was generally limited to a maximum of about 5% of the composition; such amounts are not always sufficient to impart the desired water-resistance to the article.

It has now been found that a finely divided, relatively high melting point, normally hard bitumen is a desirable filling material for use in magnesium oxychloride cement compositions and that such compositions are water-resistant and fire-resistant. Even though the bituminous materials such as "core pitch" has a melting point in the neighborhood of 275 or 300° F., or even more, the finely divided material serves as a waterproofing medium as well as a filler capable of replacing some or all of the fillers heretofore used. Apparently, the magnesium oxychloride cement, which is a highly exothermic material and becomes quite warm during the setting period, causes a softening of the pitch during the setting period so that it is capable of wetting the inorganic solid ingredients of the composition.

The bituminous material preferably used in the practice of the present invention is a meltable cokelike or friable material solid and friable enough to permit grinding or subdividing to a powder, if desired. It should preferably contain substantial amounts of both volatile material and non-volatile cokelike residue. The melting point is preferably in excess of 250° F., although hard pitches or bitumens having a melting point as low as 200 or 212° F. can be used to obtain some of the benefits of the present invention.

The pitch preferably used is generally designated on the market by the term "core pitch." It is believed to be the residue obtained after the distillation of coal tar. Other high melting friable pitches, such as the residue obtained from the distillation of petroleum, may also be used. A typical analysis of "core pitch" is as follows:

| | |
|---|---|
| Specific gravity | 1.3 |
| Melting point °F | 290 |
| Free carbon content per cent | 33 |
| Ash do | .2 |
| Volatile matter do | 53 |
| Coke residue do | 47 |

A magnesium oxychloride cement which serves both as a major binding medium in the composition of the present invention and as a fireproofing medium may contain magnesium oxide and magnesium chloride in any suitable proportions well-known to those skilled in the art to produce a hard setting material.

In the preparation of cements embodying the present invention, the magnesium oxide (magnesite), with or without the addition of other filling ingredients, is preferably first mixed with a pulverized or comminuted bitumen or pitch. This mixture is then wetted with a suitable amout of magnesium chloride solution, preferably from 25° to 35° Baumé to obtain a creamy or pasty consistency.

The amount of finely divided pitch is preferably about equal to the amount of the dry magnesium oxide used in the composition, although the proportions of these ingredients may be varied rather widely. Compositions containing one part of the pitch or solid bitumen for each 2 or 3 parts by volume or by weight of the magnesium oxide have desirable properties for certain applications. On the other hand, compositions having three or four parts of pitch for each part of magnesium oxide also have desirable properties, but generally have somewhat lower structural strength. When additional filler, such as finely divided silica, limestone and the like is present in the composition, the amount of pitch required to give optimum strength for structural properties may be somewhat reduced.

The following example illustrates the present invention: About 50 parts by volume of magnesium oxide were mixed with about 50 parts by volume of finely divided "core pitch." The powdery mixture thus obtained was then mixed with sufficient 25° Baumé magnesium chloride solution to give a pasty or relatively heavy creamy consistency and poured into suitable molds, where it is allowed to set and harden. Upon removal from the mold a shaped article which was light in weight, water-resistant, fire-resistant and had high structural strength was obtained.

Compositions produced as above set forth may be shaped to produce articles having surfaces of relatively high polish and smoothness. The compositions may be adhered to fabric, fibrous material, metals and the like to produce reinforced articles. In the preparation of such reinforced articles utilizing fabric or fibrous material which tends to absorb liquids, it is preferred, to previously dampen such fibrous material with a solution of magnesium chloride in order to prevent rapid drying of the plastic material when it is placed in contact therewith.

It is to be understood that variations and modifications of the specific compositions herein described for purposes of illustration may be made without departing from the spirit of the invention.

What I claim is:

1. A dry pulverulent composition comprising an intimate mixture of magnesium oxide and discrete particles consisting of a finely divided normally solid bitumen having a melting point of at least 250° F., said bitumen being present at least in an amount of 1 part by weight for each 2 parts by weight of said magnesium oxide, said composition after mixing with a magnesium chloride solution of 25° to 30° Baumé, in amounts to produce a creamy consistency, being characterized by setting to a hard water-resistant and fire-resistant state.

2. The composition of claim 1, in which the bitumen is a residue dried from the distillation of coal tar.

3. A solidified, water-resistant and fire-resistant product of a mixture of magnesium oxide, a magnesium chloride solution of 25° to 30° Baumé, and a finely divided normally solid bitumen having a melting point of at least 250° F., said bitumen being present in an amount of at least 1 part by weight for each 2 parts by weight of said magnesium oxide.

MAX SKOLNIK.

REFERENCES CITED

The following references are of record in the file of this patent:

UNITED STATES PATENTS

| Number | Name | Date |
| --- | --- | --- |
| 930,524 | Biles | Aug. 10, 1909 |
| 1,607,405 | Lukens | Nov. 16, 1926 |
| 1,752,194 | Ohlsen | Mar. 25, 1930 |
| 2,198,776 | King et al. | Apr. 30, 1940 |